United States Patent [19]
Glenn

[11] 3,882,271
[45] May 6, 1975

[54] DISPLAY USING ARRAY OF CHARGE STORAGE DEVICES

[75] Inventor: William E. Glenn, Stamford, Conn.

[73] Assignee: Columbia Broadcasting System, Inc., New York, N.Y.

[22] Filed: Nov. 13, 1973

[21] Appl. No.: 415,334

[52] U.S. Cl. .............................................. 178/7.3 D
[51] Int. Cl. .............................................. H04n 3/14
[58] Field of Search ......... 178/7.3 D, 7.5 D; 358/62

[56] References Cited

UNITED STATES PATENTS

| | | | |
|---|---|---|---|
| 2,740,830 | 4/1956 | Gretener | 358/62 |
| 2,896,507 | 7/1959 | Mast et al. | 178/7.5 D X |
| 3,504,114 | 3/1970 | Irwin et al. | 178/7.3 D X |
| 3,676,588 | 7/1972 | Kozol et al. | 178/7.5 D |
| 3,746,785 | 7/1973 | Goodrich | 178/7.5 D |

*Primary Examiner*—Richard Murray
*Assistant Examiner*—Aristotelis M. Psitos
*Attorney, Agent, or Firm*—Martin Novack; Spencer E. Olson

[57] ABSTRACT

An apparatus which receives a video signal representative of an image and displays the image in viewable form. In accordance with an embodiment of the invention there is provided a semiconductor substrate having an array of semiconductor devices formed in a surface thereof. Each of the devices is adapted to receive an element of video information as represented by stored charge. Means are provided for sampling the video signal and temporarily storing elemental samples thereof in the semiconductor devices. A layer of electrically deformable material is disposed on the substrate and a conductive means is disposed on the layer of deformable material. The charge pattern of the semiconductor devices creates a field with respect to the conductive means on the surface of the deformable material and this field, in turn, deforms the deformable material effectively causing "ripples" therein. Optical means are provided for converting these deformations of the deformable material into an image. In a preferred embodiment of the invention the optical system comprises a Schlieren system.

20 Claims, 10 Drawing Figures

DISPLAY USING ARRAY OF CHARGE STORAGE DEVICES

BACKGROUND OF THE INVENTION

This invention relates to the display of electronic video information utilizing a light beam in conjunction with an electronically deformable medium.

Electronic video information is conventionally displayed using a cathode ray tube which employs one or more electron guns in a vacuum atmosphere. Due to the nature of their physical construction, conventional television display tubes are necessarily limited in size and performance is generally limited by factors such as the efficiency of a particular screen phosphor being used.

Previous techniques have been developed for projecting one or more beams of light which are modulated by electronic video information, the modulated beam being repetitively scanned to form a relatively large image on a screen or the like. This technique has been successfully employed, for example, using laser beams, but it is found that complex and expensive equipment is needed to properly generate, modulate, and scan a laser to form a suitable image. Also, the efficiency of such systems in terms of lumens output per watt input is relatively low.

Another type of television projection system employs a deformable oil film which is impinged upon with a scanned modulated electron beam. This causes deformations in the film which are "read" with an optical system to achieve a projected image containing the information originally used to modulate the electron beam. One drawback of this system relates to the resolution required from the electron gun, especially in a system where a single gun is employed to achieve a color display. When multiple guns are used to obtain a color display, a problem of beam registration arises. Another disadvantage of this type of system is ultimate damage to the oil film which results from the electron bombardment and causes performance degradation.

It is accordingly an object of this invention to provide an apparatus capable of displaying television information on a relatively large screen area, but without the need for scanning a focused light beam or an electron beam in repetitive fashion.

SUMMARY OF THE INVENTION

The present invention is directed to an apparatus which receives a video signal representative of an image and displays the image in viewable form. In accordance with an embodiment of the invention there is provided a semiconductor substrate having an array of semiconductor devices formed in a surface thereof. Each of the devices is adapted to receive an element of video information as represented by stored charge. Means are provided for sampling the video signal and temporarily storing elemental samples thereof in the semiconductor devices. A layer of electrically deformable material is disposed on the substrate and a conductive means is disposed on the layer of deformable material. The charge pattern of the semiconductor devices creates a field with respect to the conductive means on the surface of the deformable material and this field, in turn, deforms the deformable material effectively causing "ripples" therein. Optical means are provided for converting these deformations of the deformable material into an image.

In a preferred embodiment of the invention the optical system comprises a Schlieren system. Further features and advantages of the invention will become readily apparent from the following detailed description when taken in conjunction with the accompanying drawings.

DESCRIPTION OF THE PREFERRED EMBODIMENT

Figure 1:
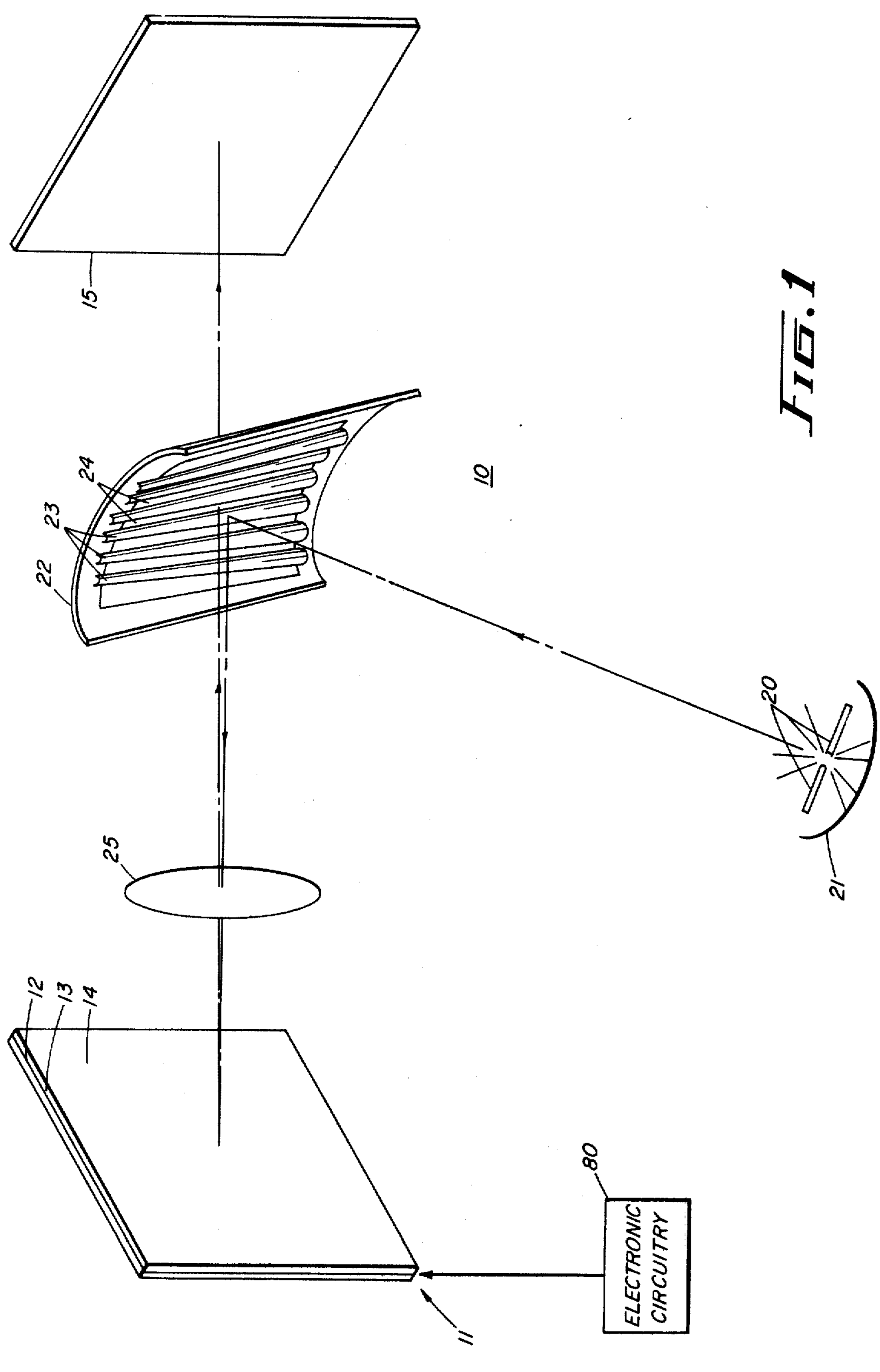
FIG. 1 is a simplified schematic diagram of an embodiment of an apparatus in accordance with the invention.

Referring to FIG. 1, there is shown a simplified schematic diagram of an apparatus 10 in accordance with an embodiment of the invention. A semiconductor substrate 11 has an array of semiconductor devices formed in a surface 12 thereof and is provided with a layer of deformable material 13 which covers the surface 12. A reflective layer 14 of conductive material is disposed over the deformable layer 13. The semi-conductor array and associated circuitry 80, to be described in detail hereinafter, receives and samples a video signal, the samples ultimately being stored as a charge pattern on the surface 12 of semiconductor 11. The electric field associated with the charge pattern deforms the deformable material 13 so that information is contained in the reflective layer 14 in the form of depressions or ripples which are similar to a phase diffraction grating. This information is then displayed on a screen 15, such as by using a Schlieren type of optical system.

The optical system depicted in FIG. 1 is of the type disclosed in my U.S. Pat. No. 3,084,590. In this system arc electrodes 20 generate an intense light source that is directed by a curved mirror 21 over a masking system 22 which includes a plurality of reflecting bars 23 separated by transparent areas or slits 24. The masking system 22 is positioned so that the light reflected from the bars 23 is transmitted toward a lens 25 where it is focused into parallel rays. (The bars 23 can be considered as a plurality of sources.) These rays are incident on the deformed reflective surface 14 and are reflected back through the lens 25 toward the masking system 22. If, at a given instant, there were no depressions on the surface 14 to divert the light rays, the rays effectively emanating from each bar 23 would be focused by lens 25 on the same bar and no light would be incident on the screen 15. However, if there are depressions in the surface 14 they will act as diffraction gratings and some light will be diffracted and ultimately pass through the slits 24. The portion of a light ray transmitted through a particular slit depends on the amplitude of the infinitesimal diffraction grating from which the ray was diffracted. Thus, an appropriate pattern of diffraction gratings, resulting from a selected charge pattern, will yield a desired image on the screen 15. In the present embodiment the charge pattern is derived from an array of charge-coupled semiconductor devices, the charge pattern being changed at a rate wich is a function of the field rate of the received video signal.

Figure 2:
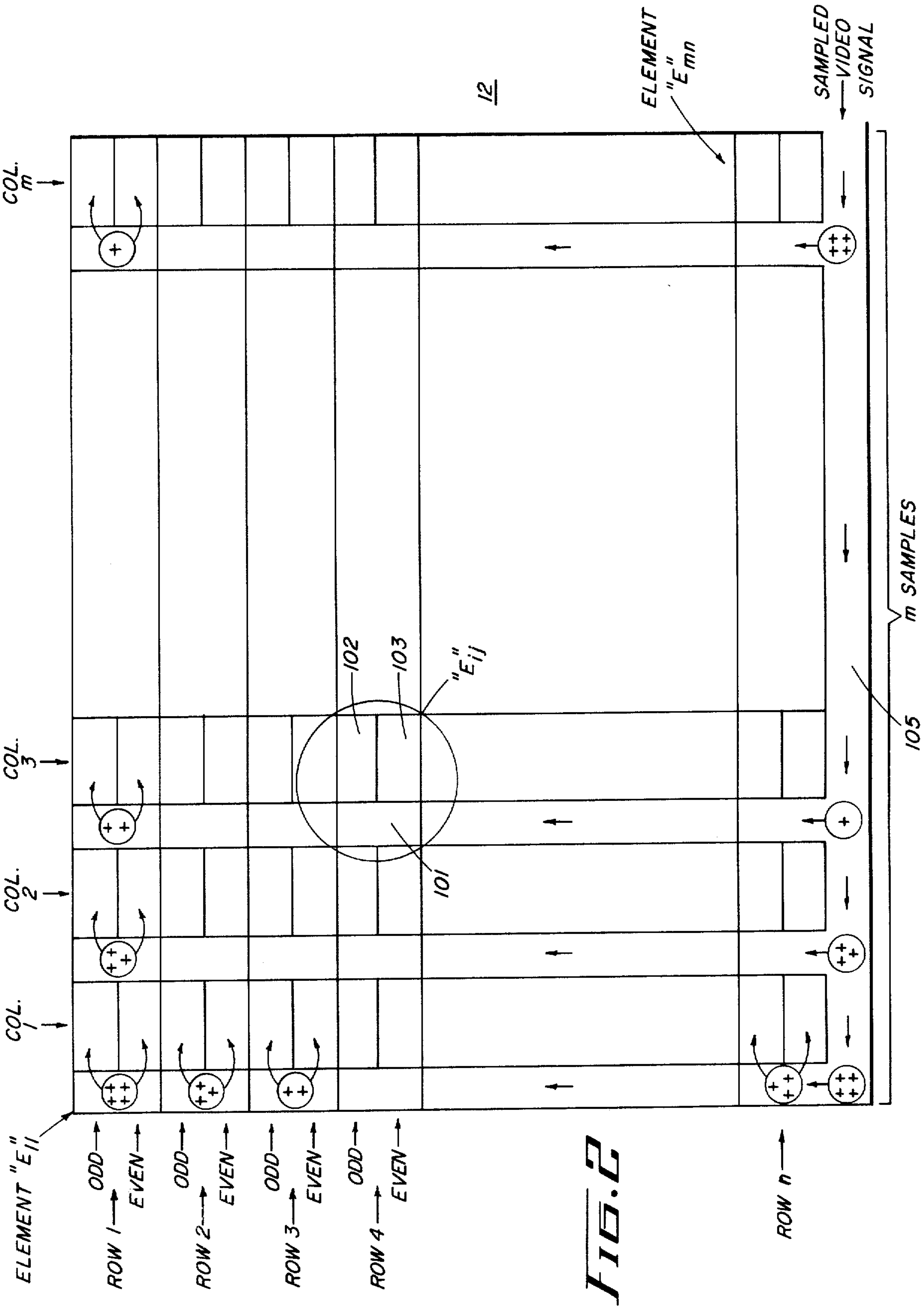
FIG. 2 is a simplified plan diagram that is helpful in describing the flow of charge-representative information in the embodiment of FIG. 1.

FIG. 2 is a simplified plan diagram that is useful in describing the manner in which a desired charge pattern is achieved on the semiconductor array of the present embodiment. The semiconductor surface 12 is represented as including a plurality of elemental areas designated by the symbol "$E_{ij}$". The subscript $i$ represents the row number of a particular element and the subscript $j$ represents the column number of that element, so an element $E_{ij}$ indicates the element located at row $i$ and column $j$. In the diagram of FIG. 2 an array having dimensions m by n is illustrated with only a few of the actual elements being specifically shown. Each element E includes a charge transfer and storage region 101 that will be described in further detail below as including certain electrodes, as well as upper and lower "display" regions designated 102 and 103, respectively. In the present embodiment, the charge transfer and storage regions 101 each include a single three-stage charge-coupled device unit or stage so that each column consists of n charge-coupled stages in series. An additional chain of charge-coupled device units, designated by reference numeral 105, is provided along the bottom of the array. The chain 105, referred to hereinafter as an input register, includes m charge-coupled device units which are coupled in conventional serial fashion and also individually coupled in parallel to the charge-coupled device units of row n.

During operation, a line of video signal, for example a line of conventional television video, is sampled to generate $m$ samples during the line. The m samples are serially fed into the input register 105 and stored as packets of charge in the m charge-coupled device units of the register 105 as illustrated by the small plus signs encircled at the different elemental positions along register 105. After the line has been stored in the register 105, the information contained in each charge-coupled device unit is transferred simultaneously into the charge-coupled device units of rown n so that, for example, the charge packet which had been stored in the column 1 position of the register 105 would enter the charge-coupled device unit of element $E_{1n}$, the charge packet which had been stored in the column 2 position of register 105 would be transferred to the charge-coupled device unit of element $E_{2n}$, and so on. This transfer is preferably achieved during the horizontal blanking interval of a television signal. The next line of video is then sampled and read into the register 105 in the same way. The new line of information is then transferred into row $n$ of the array and the information which had been in row $n$ is transferred in parallel to the next higher row in the array; i.e., row $n$-1. This procedure continues with the information propagating in parallel line by line through the array until the first received line of video information reaches row 1 at the top of the array. At this point, for a television field having $n$ lines, the array has stored the line information of the field in an order which corresponds to the order in which the video information was intended to be displayed. As an example, for a conventional NTSC television signal, 262 full lines of information will have been received and will now be successively stored in rows 1 through 262 of the array.

Assuming the television signal is of NTSC form, the field of video information which has just been received will be either an "odd" or "even" field of a single video frame. If it is an odd field, the information in each charge-coupled device unit 101 of each element E is transferred into the "display" region 102 of the element. In the present embodiment, the transfers in all elements are effected simultaneously during the vertical blanking interval of the television video signal. The elemental packets of charge from this "odd" field subsequently remain in the display regions 102 until the next "odd" field of video information is read into the array. In the meantime, an "even" field of video information is sampled one line at a time and read into the charge-coupled device units of the array in the manner described above. In this case, however, the packet of charge which comes to rest in each charge-coupled device unit of each element is transferred into display region 103 of that element. This is achieved during the vertical blanking interval which follows the "even" field. A new "odd" field of information is then received and, after clearing the old information from the display regions 102 (also done during the vertical blanking interval), the new "odd" field is entered in the display region 102. The procedure continues in this same manner as new video information is received and constantly refreshed charge pattern arrays are generated in response thereto.

Figure 3:
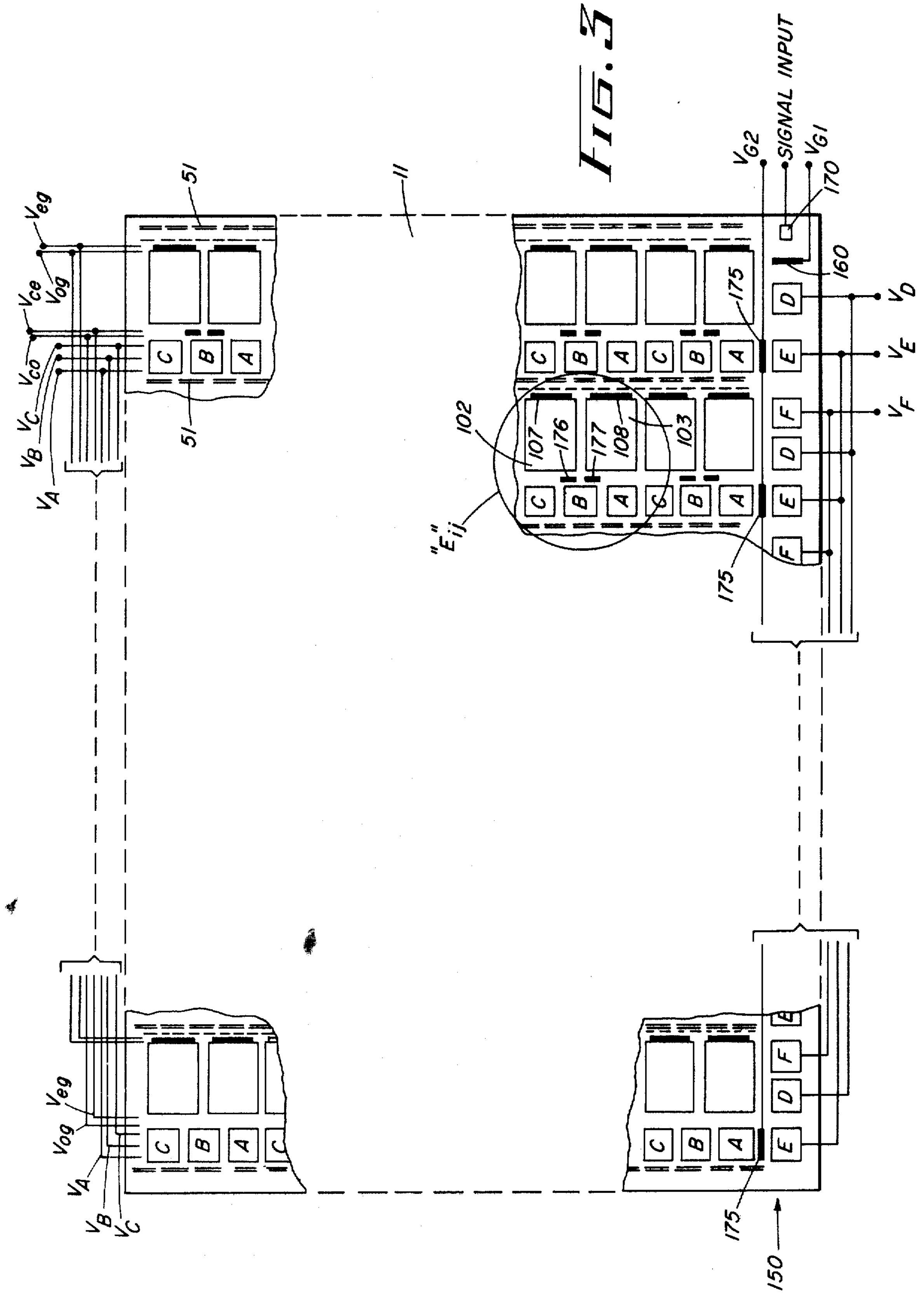
FIG. 3 is a plan view of a semiconductor array in accordance with the preferred embodiment.

FIG. 3 is a more detailed plan view of the semiconductor array in accordance with the present embodiment of the invention. The array columns formed in semiconductor substrate 11 are isolated by diffusions 51 which extend longitudinally down the semiconductor substrate between columns of the array. In the present embodiment the semiconductor substrate is selected as N-type so the diffusions are P+ regions. Each element E of the array was described above as including a charge transfer and storage region 101 which is seen in FIG. 3 to comprise a three-phase charge-coupled device element having three metal electrodes labeled A, B, and C. The functioning of charge-coupled devices is known in the art and is described, for example, in an article entitled "Charge-Coupled Devices" which appeared at pages 18–27 of the July 1971 issue of *IEEE Spectrum*. A description of the utilization of charge-coupled devices in an array to store video information can be found in an article entitled "A Charge-Coupled Area Image Sensor and Frame Store" which appeared in the *IEEE Transaction on Electron Devices*, Volume 20, No. 3, March 1973. Briefly stated, the application of appropriate clocking voltages to the electrodes of a chain of charge-coupled devices allows information, in the form of stored charge, to propagate from stage-to-stage of the chain. Minority carriers (or the absense of same) are stored in "potential wells" near the surface of the semiconductor material which is isolated from the electrodes by an oxide layer. The minority carriers move from under one electrode to a close adjacent electrode when a more negative voltage is applied to the adjacent electrode. The devices are generally of either a "two-phase" type (i.e., two electrodes per stage with transfers effected by a two phase clock) or a three-phase type (i.e., three electrodes per stage with transfers effected by a three phase clock). The three-phase type is selected for use in the present illustrated embodiment but the availability of alternate forms will be clear to those skilled in the art.

With continuing reference to FIG. 3, the input register 150 comprises a chain of three-phase charge-coupled device units, each unit having three electrodes respectively labeled D, E, and F. These electrodes are energized by a three-phase clock signal represented by voltages designated $V_D$, $V_E$ and $V_F$. It can be seen that all D electrodes receive clock voltage $V_D$, all E electrodes receive clock voltage $V_E$ and all F electrodes receive clock voltage $V_F$. All A, all B, and all C electrodes in the array are also respectively energized by three phases of clock voltage designated $V_A$, $V_B$ and $V_C$. The clock energizing lines are shown in FIG. 3 as being available at the various columns of the semiconductor array but, for the sake of clarity, individual connections to the A, B and C electrodes are not shown. The technique of interconnection is, however, discussed hereinbelow.

The input register 150 is provided at its entrance end with an input gate electrode 160 and a diffused input diode 170. The video signals to be displayed are received at the diode 170 and effectively sampled and transferred to the chain of charge-coupled devices by application of appropriate gating signals to the input gate 160 and simultaneous application of gating signals to the charge-coupled device electrodes of input register 150. Specifically, a gating pulse $V_{G1}$ is applied to the electrode 160 in time coincidence with the application of a negative clock voltage to the D electrodes. In this manner, the charge in the diffused diode (i.e., the absence of charge or positive charge) is temporarily captured by the potential well under the electrode 160 and immediately enters a potential well under the more negative electrode D which is adjacent to the input gate 160. Periodic sampling of this nature occurs during a line of video signal and the successive samples are propagated down the register 150 until a full line of information is stored in the m elements thereof. By appropriate selection of the clocking phase, the charges can be caused to come to rest under any one of three electrodes of the charge-coupled device units. In the present embodiment, the charge packets are caused to come to rest under the E electrodes in each charge-coupled device unit of register 150. Adjacent each E electrode in the register is a transfer gate 175 which is also adjacent, on its other side, to the A electrode of the charge-coupled device unit in the adjacent row n of the appropriate column of the array. The transfer gates 175 are coupled in common by appropriate metalization to an input terminal to which is applied transfer pulses $V_{G2}$. Specifically, a transfer pulse is applied during the horizontal blanking interval to transfer the charge packet under each E electrode to the potential well below the adjacent A electrode of row *n*. The transfer phenomena is similar to that described in conjunction with the input gate. The transfer pulse is applied simultaneously with the clock signals $V_A$, $V_B$ and $V_C$ to effect the propagation of the charge packet information along the columns of the array. As stated, the transfer pulse and the clocking signals to the A, B and C electrodes are applied during the horizontal blanking periods so that the information effectively moves up by one row during each horizontal blanking interval.

The clocking voltages $V_A$, $V_B$ and $V_C$ are of a relative phase relationship that results in the packets of charge information coming to rest under the B electrodes of the charge-coupled devices in the array. Adjacent each B electrode are a pair of gate electrodes labeled 176 and 177. The gate electrode 176 is sandwiched between electrode D and the "display area" 102 whereas the gate electrode 177 is sandwiched between the B electrode and the "display area" 103. All of the gate electrodes 176 are coupled in common to a signal $V_{co}$ and all of the gate electrodes 177 are coupled in common to another line which receives the signal $V_{ce}$. These lines are shown as being available at each column of the array but, again, individual connections (to be described below) are omitted in FIG. 3 for clarity of illustration.

During the vertical blanking interval of the television video signal, and depending on whether an "odd" or "even" field of information has just been read into the array, either the gates 176 or 177 are energized to effect the transfer of the charge information into their associated "display regions" 102 or 103. Before receiving this information in the form of charge (or the absence thereof) the display regions are cleared of the information they previously held and biased at a potential that is suitable to facilitate transfer of the charge from the B electrodes to the display regions. In the present embodiment the display regions are P-type regions which have been diffused into the N-type substrate 11. The clearing and biasing of these regions is accomplished by action of gate electrodes 107 and 108 which are respectively associated with display regions 102 and 103. Alongside the gate electrodes 107 and 108 is a P+ diffusion 109 which runs the length of each column of the array and which is biased by a common bus at the edge of the array (not shown) at a negative voltage, $V_0$. The gate electrodes 107 are all coupled in common to a line which receives gating signals designated $V_{og}$. Once again, for clarity, these gating voltages are indicated as available for coupling two of these gates at each column of the array, but individual connections are omitted in FIG. 3. During the vertical blanking interval of the television video signal, and when the "odd" gates are to be cleared of the charge-representative information they had held during the previous frame, a positive voltage pulse $V_{og}$ is applied to the gates 107. This causes the display regions 102 to temporarily assume the negative bias voltage, $V_0$, as will be described below. Similarly, when an "even" field of information is to be cleared during a vertical blanking interval, the application of a positive voltage pulse $V_{eg}$ to the gate electrodes 108 causes the display regions 103 to temporarily assume the negative bias voltage $V_0$.

Figure 4:
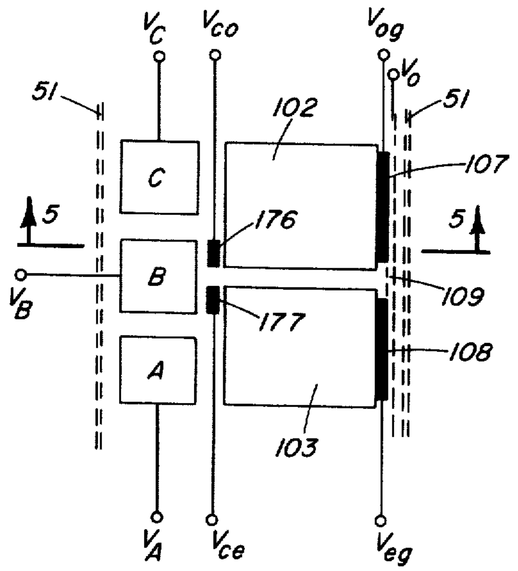
FIG. 4 is an enlarged plan view of an element of the array of FIG. 3.
Figure 5:
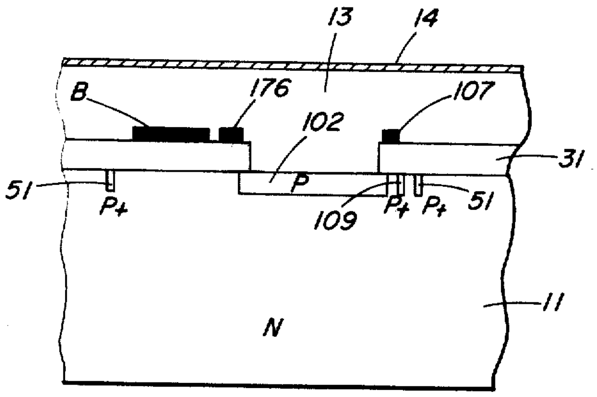
FIG. 5 is a cross-sectional view as taken through a section defined by arrows 5—5 of FIG. 4.

FIG. 4 is an enlarged view of an element E of the array and FIG. 5 shows a cross-section taken through the sections indicated by the arrows 5—5 of FIG. 4. With reference to these FIGURES, it is seen that the N-type substrate 11 has diffused therein a pair of P+ regions 51 which act as isolating regions for the various columns of the array as indicated above. Also diffused into the N-type substrate are the P-type display regions 102 and 103, the display regions 102 being visible in FIG. 5 by virtue of the particular position at which the cross-section is taken. FIG. 5 illustrates that the various electrodes on the array are separated from the N-type substrate 11 by an insulating layer 31 of silicon dioxide. Visible in this particular cross-section are the electrodes B of the charge-coupled device, the gating electrode 176, and the gating electrode 107. The signals coupled to each portion of the illustrated element are indicated in FIG. 4. A layer of electrically deformable material 13 is disposed over the surface of the semiconductor substrate 11. This layer may consist, for example, of a silicone gel of the type available from General Electric Corporation, but any suitable electrically deformable material can be employed. A light reflective layer 14, which may comprise a layer of indium, is disposed on the surface of the electrically deformable material 13.

It is useful to describe the operation of an element E of the array while referring to FIG. 5. When a new full field of video information has been read into the array, a packet of positive charge, representative of an elemental sample of this field of information, will have been captured in a potential well located in the semiconductor material below the electrode B. At this time, the electrode B will have a negative potential applied thereto so that the sample of information will be in the form of positive charges (i.e., minority carrier holes) at the surface of the semiconductor substrate 11 beneath the electrode B. Before this information-representative charge is transferred into the display region 102, the information previously contained in area 102 must be removed and the region should be biased at a voltage which is convenient for operation. These objectives are achieved by applying pulse $V_{og}$ of negative voltage to the gate 107, the voltage pulse being sufficient to cause a P-type inversion layer or channel between the P+ region 109 and the P-type display region 102. The region 109 is biased at a voltage $V_0$ which may typically be −50 volts. The presence of the conductive channel causes the region 102 to assume a like voltage of −50 volts as is evident from conventional field-effect device operation. After the occurrence of the voltage pulse $V_{og}$, the display region 102 is at a potential of −50 volts and is prepared to receive the sample information from under the charge-coupled device electrode B. At this time, a negative voltage pulse $V_{co}$ is applied to the gate 176, this voltage pulse being more negative than the negative voltage currently applied to the electrode B. The presence of this voltage on the gate electrode 176 gives rise to a negative potential which attracts the charge packet under electrode B toward a position where it is captured by the highly negative display region 102. When this occurs, the potential of region 102 will be altered by an amount that relates to the amount of charge in the elemental sample which had been previously located under the B electrode. For example, the amount of positive charge in the elemental sample may be sufficient to reduce the potential of the region 102 to −26 volts. It follows that the region 102 will have a potential that varies in proportion to the magnitude of the elemental sample, the highest ultimate potential of the region being, say, −10 volts, and the lowest potential, of course, being −50 volts (for a sample of zero charge).

The potential of the display region 102 affects the magnitude of the field as between the region 102 and the reflective conductive coating 14 which is maintained at ground potential. The degree of distortion of the material 13 and its coating 14 are a function of the field. The optics of the system (FIG. 1) are calibrated such that a display region voltage of −50 volts yields a blanked area on the display screen 15 at the elemental position which corresponds to the position of the array element under consideration. As the voltage of the region 102 is increased (to less negative values) the different degree of diffraction caused by the reflective coating over the particular display region causes additional light to pass through a slit 24 in the optical mask 22 so that the corresponding elemental area on the display screen is imparted additional brightness. In this manner, an image corresponding to the information in the television video signal is displayed on the screen 15.

Figure 6:
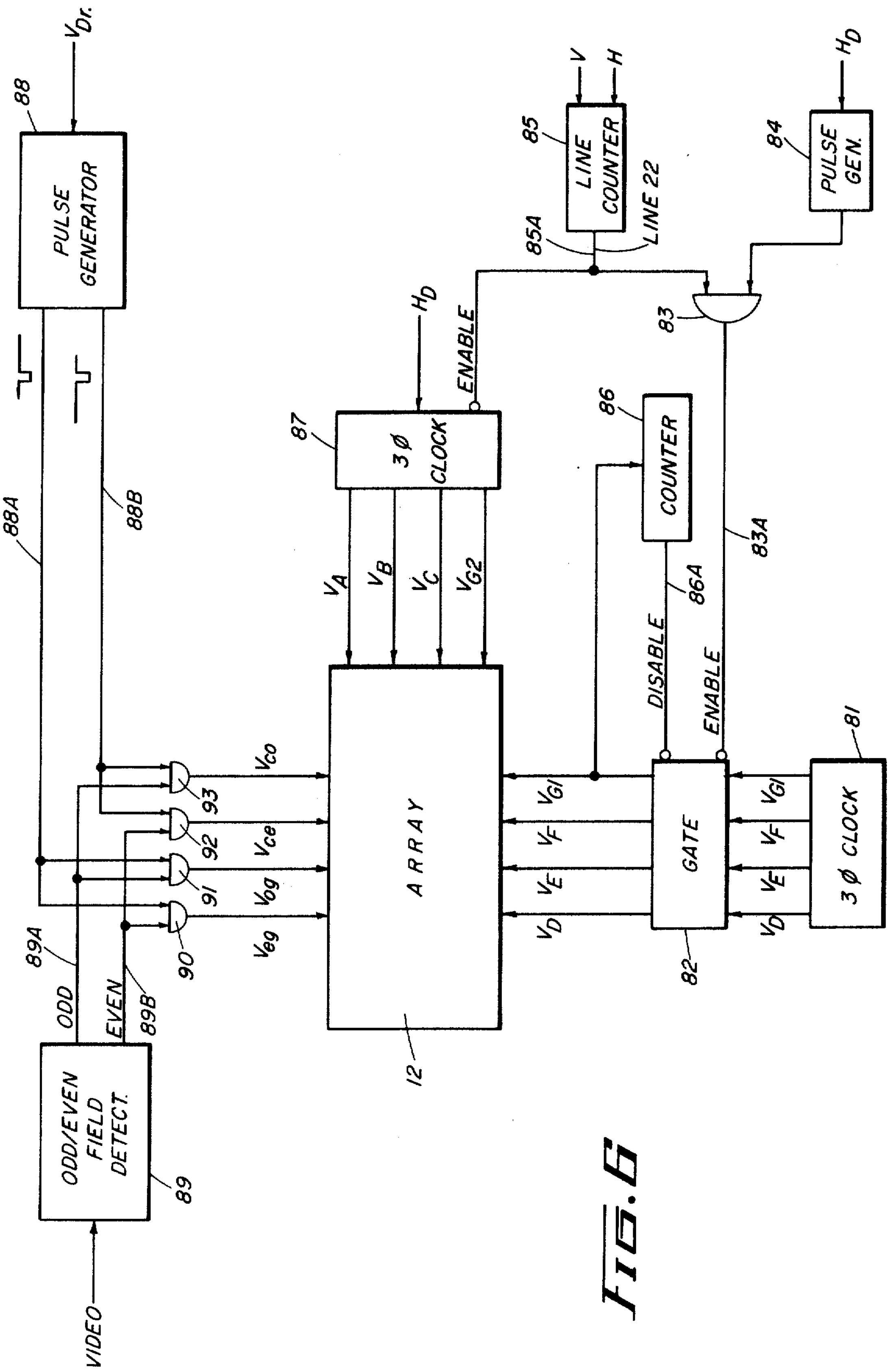
FIG. 6 is a block diagram of circuitry utlized to energize the array of the embodiment of FIG. 1.

Referring to FIG. 6, there is shown an embodiment of a block diagram of circuitry suitable for generating the signals used to energize the array as shown in FIGS. 3, 4 and 5. In FIG. 6 the array formed in the surface 12 of semiconductor 11 is shown as receiving the previously discussed signals designated $V_A$, $V_B$, $V_C$, $V_{G2}$, $V_D$, $V_E$, $V_F$, $V_{G1}$, $V_{eg}$, $V_{og}$, $V_{ce}$ and $V_{co}$. In the diagram of FIG. 6 it is assumed that an NTSC television video signal has been processed using conventional sync stripping circuitry and the like to generate vertical and horizontal sync and drive signals as well as displayable video. The clock signals $V_D$, $V_E$, $V_F$, and $V_{G1}$, are generated by a three-phase clock 81 which, in the present embodiment, operates at 10 MHz. The three distinct phases are defined by the clock voltages $V_D$, $V_E$ and $V_F$, with the gating voltage $V_{G1}$ being in phase with one of the three as will be discussed. The application of the four voltages from clock 81 to the array is controlled by a gate 82. Gate 82 is enabled by a signal on a line 83A which is the output of an AND gate 83. AND gate 83, in turn, receives inputs from a pulse generating circuit 84 and a line counter 85. The line counter 85 receives the vertical sync pulse V and the horizontal sync pulse H and counts the number of horizontal scanlines during each field. At the occurrence of the twenty-second scanline (the first scanline of visible picture video in the NTSC system) a signal is generated on a line 85A and remains for the rest of the field and until the counter is reset by the vertical sync pulse V. Thus, one input to the AND gate 83 is "on" during the active picture video. The horizontal drive pulse $H_D$ is received by the pulse generating circuit 84 which may comprise a pair of one-shot multivibrators in series. The circuit 84 is operative to generate a short pulse about 11.3 microseconds after the leading edge of $H_D$. This pulse becomes an enable signal on the line 83A and occurs coincidentally with the beginning of active video on each horizontal scanline during a video field. Picture video is received at the input diode 170 (FIG. 3) but is sampled and transferred along the input register 150 only during the presence of the input signal $V_{G1}$ and the clocking signals $V_D$, $V_E$, and $V_F$. The enable signal on line 83 occurs simultaneously with the beginning of active video, so the gate 82 passes the clocking signals and gating signal to effect the read in of video samples into the input register 150. A counter 86 also receives the gating signals $V_{G1}$ and produces an output on a line 86A after a predetermined number of gating signals have been counted. For example, if there are 500 stages in the input register 150, the counter 86 would be adapted to produce an output on line 86A upon the occurrence of 500 gating signals. The signal on line 86A is operative to disable the gate 82 (during the horizontal blanking interval) until the next enable signal on line 83A. In this manner, the gate 82 controls the occurrence of the gating signal $V_{G1}$ and the clocking signals, $V_D$, $V_E$ and $V_F$, to cause read in of successive lines of video information during a video field.

Continuing with the description of FIG. 6, after each line of information has been read into the input register 150 (FIG. 3), it is necessary that this information be transferred from the E electrodes of the register 150 into row n of the array, the information in row n being transferred into row *n*-1, and so on. This is achieved by applying the appropriate gating signal $V_{G2}$ and the clock signals $V_A$, $V_B$, and $V_C$ to the array. A three phase clock 87 is enabled by the signal on line 85A to generate the desired set of clocking signals and gating signal at the end of each active horizontal scanline or, more specifically, during the horizontal blanking interval which follows each active scanline. The clock 87 is synchronized with the line rate of the television signal so, for an NTSC system, it operates at 15.75 KHz. One full period of clock pulses is thus generated during the horizontal drive signal; i.e., during the first 6 microseconds of blanking on each horizontal line. These clocking signals and gating signals, described in further detail hereinbelow, are operative to transfer the information from row to row of the array so that it comes to rest in the B electrodes of the charge-coupled device elements of the array.

After a full field of video information has been read into the array, the signals $V_{eg}$, $V_{og}$, $V_{ce}$ and $V_{co}$, are utilized to effect the transfer of information into the display regions 102 or 103 (FIG. 4). These signals are generated by circuitry that includes a pulse generator 88 which may comprise a plurality of one-shot multivibrators. The pulse generator 88 is triggered by the vertical drive pulse $V_{Dr.}$ to generate successive pulses on a pair of output lines designated 88A and 88B. The pulses on lines 88A and 88B occur near the beginning of the vertical blanking interval and each have a short duration of about 10 microseconds. The pulse on line 88B is selected to occur about 5 microseconds after the end of the pulse on line 88A. The pulse on line 88A becomes the gating signal $V_{eg}$ or $V_{og}$, depending upon whether the preceding video field has been an "odd" or an "even" field. This latter factor is determined using an odd/even field detect circuit 89 which receives a video signal and examines the vertical serration in conventional fashion to determine whether the field is "odd" or "even." During an "odd" field (i.e., more accurately the active video portion of an "odd" field and the following vertical blanking interval) the circuit 89 produces an output on line 89A whereas during an "even" field it produces an output on line 89B. Line 89A is coupled as one input to the AND gates labeled 91 and 93 and the line 89B is coupled as one input to the AND gates labeled 90 and 92. The line 88A is coupled as the other input to the AND gates 90 and 91 so it should be apparent that the pulse on line 88A becomes the gating signal $V_{og}$ during the vertical blanking interval following "odd" fields and becomes the gating signal $V_{eg}$ during the vertical blanking interval following "even" fields. In similar fashion the line 88B is coupled as the other input to the AND gates 92 and 93 so that the pulse on line 88B becomes the gating signal $V_{ce}$ during the vertical balnking interval following an "even" field and becomes the gating signal $V_{co}$ during the vertical blanking interval following an odd field.

Figure 7:
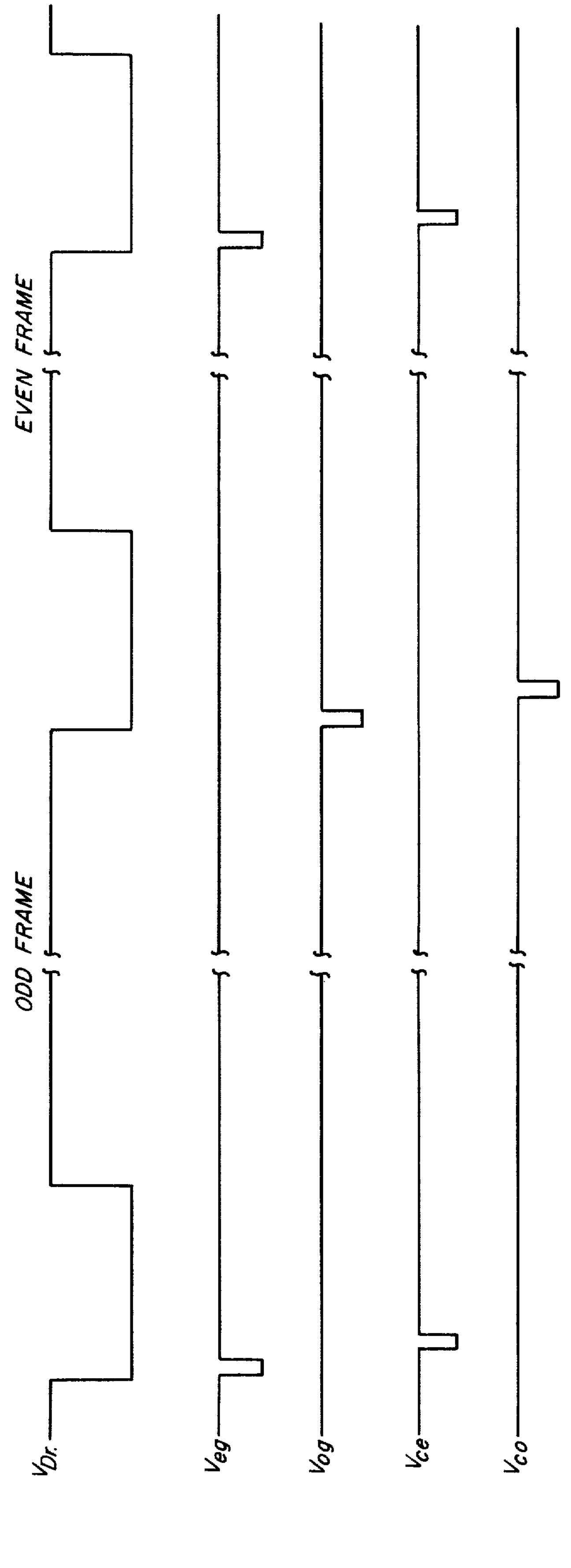
FIGS. 7, 8 and 9 are timing diagrams that are helpful in understanding operation of the preferred embodiment.
Figure 8:
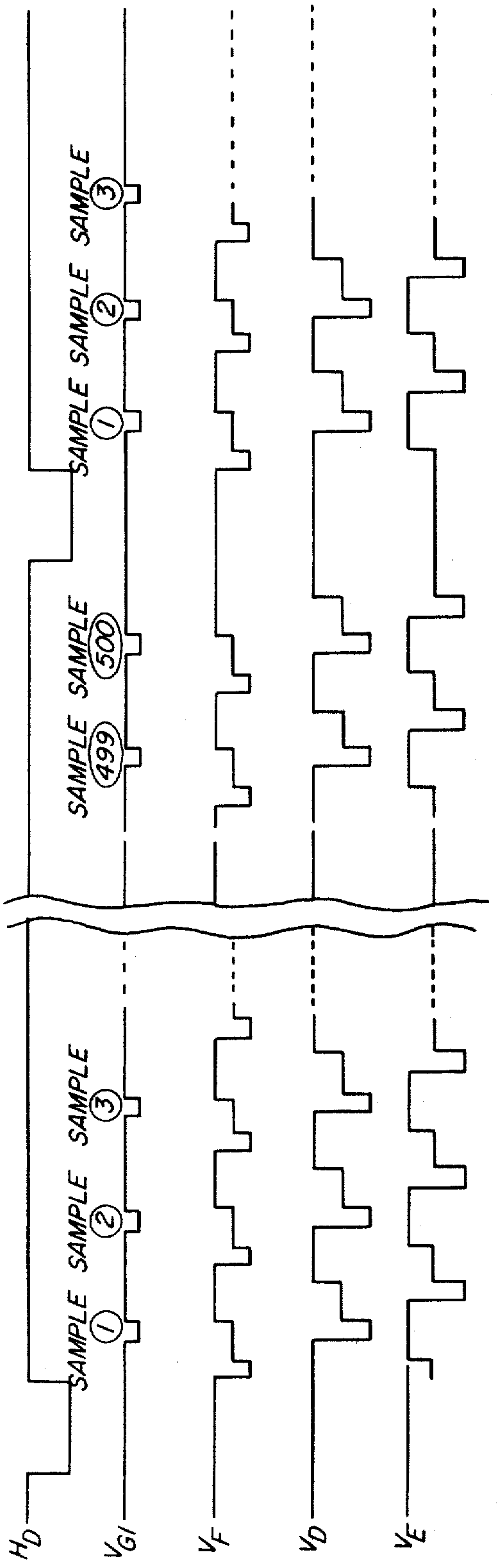
Figure 9:
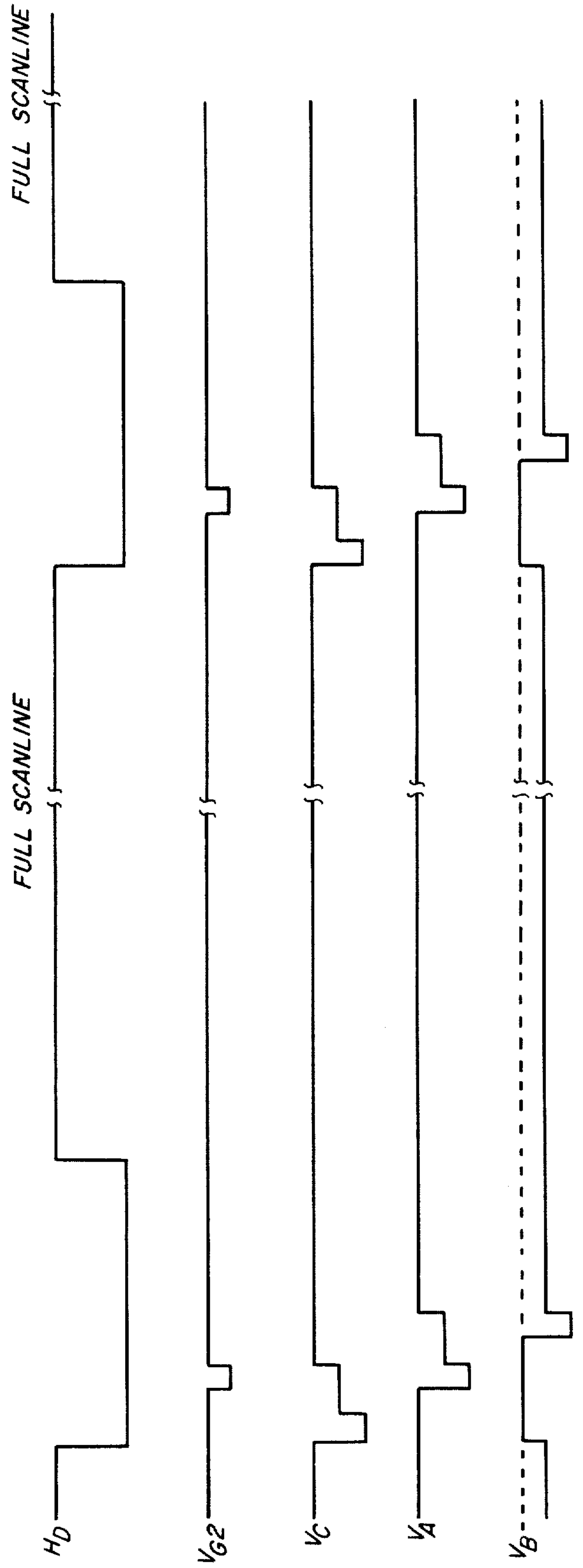

FIGS. 7, 8 and 9 illustrate the type of gating and clocking signals that are generated by the circuitry of FIG. 6 and are helpful in envisioning the overall timing of the system. FIG. 7 illustrates the timing of the signals $V_{eg}$, $V_{og}$, $V_{ce}$, and $V_{co}$ with respect to the vertical drive signal. It is seen that during the vertical blanking interval that occurs after an "even" field, the pulses $V_{eg}$ and $V_{ce}$ occur in succession. Similarly, during the vertical blanking interval after an "odd" field, the signals $V_{og}$ and $V_{co}$ occur in succession. As discussed above, these signals are operative to transfer information from the charge-coupled device units of the array on semiconductor surface 12 into the appropriate display regions of the array.

FIG. 8 illustrates the timing of the signals $V_D$, $V_E$, $V_F$ and $V_{G1}$ with respect to individual scanlines during a field as indicated by the horizontal drive signal $H_D$. Portions of two scanlines are shown in the FIGURE, it being assumed that the illustrated scanlines occur during active picture video; i.e., after line 21 of the field. The occurrence of the horizontal drive pulse for a given scanline initiates the clocking signals $V_D$, $V_E$, and $V_F$ and the gating signal $V_{G1}$ as was described with reference to FIG. 6. The clocking signals have the conventional waveform utilizied for clocking three phase charge-coupled devices. It is seen that the first transfer impetus (negative-going waveform portion) is applied to the F terminals (FIG. 3) and the gate 160 is activated simultaneously with transfer of information to the D terminals. The number of the elemental sample transferred into the input register 150 is indicated in a circle above the gating signal pulses $V_{G1}$, there being 500 elemental samples per line in the present embodiment. At the end of each scanline the E electrodes are maintained at a negative potential so that the charge-representative samples are captured under these electrodes until transferred to the A electrodes of row *n* during the horizontal blanking interval. This operation is described with the aid of FIG. 9 which shows the timing of the clocking signals $V_A$, $V_B$ and $V_C$ and the gating signal $V_{G2}$ with respect to the horizontal drive pulse $H_D$. It is seen that one full cycle of these clocking waveforms is generated during each horizontal blanking interval of active video. The first most-negative-going signal portion is applied to the C electrodes so that chargerepresentative information which had been contained under each D electrode is transferred to its adjacent C electrode. Transfer is next effected to the A electrodes and the gating signal $V_{G2}$ is simultaneously applied so that information in the E electrodes of register 150 is transferred into the A electrodes of row *n*. Finally, the charge-representative information is transferred to the B electrodes where it remains during the horizontal blanking interval as is indicated by the negative voltage $V_B$. The clocking signals illustrated in FIGS. 8 and 9 continue for a full video field whereupon clocking signals illustrated in FIG. 7 effect the transfer of information into the appropriate display regions. The process is then repeated for the next video field.

Figure 10:
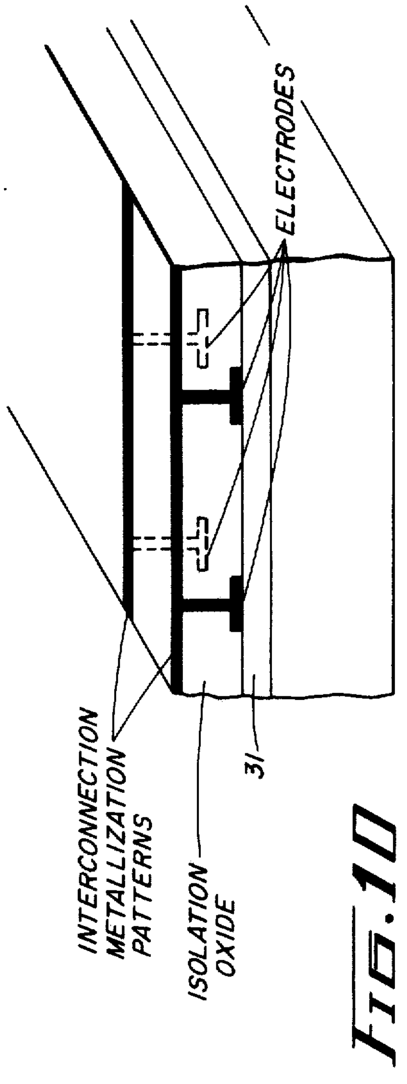
FIG. 10 is a simplified cross-section of a semiconductor surface illustrating the type of interconnections that can be employed in fabricating the preferred embodiment.

The array of semiconductor devices of the present embodiment can be formed in a surface 12 of a semiconductor substrate by employing multiple metalization layers to achieve cross-over of the many metal leads required. Specifically, in the present embodiment an N-type substrate is provided with an oxide layer through which the diffusion regions 51, 109 and 102 (FIG. 5) are formed by conventional techniques. After stripping of the working oxide layer and formation of the permanent oxide layer 31, the seven electrodes for each element, A, B, C, 176, 177, 107 and 108 are formed by applying an appropriate metalization pattern. After application of an isolation oxide layer, access apertures are etched to all seven sets of electrodes and leads are applied by conventional technique. An interconnecting metallization pattern is then applied. If desired, additional layers of isolation oxide can be employed to apply any number of metallization levels considered necessary. FIG. 10 illustrates the principle of metallization levels which can be utilized to advantage in the present invention. When all interconnections have been formed apertures are etched through remaining oxide to expose the P-type regions 102 and 103 (FIGS. 4 and 5). A layer of silicone gel 13 is then applied on the surface of the substrate and a thin light-reflective layer 14 of indium is disposed on the gel as by evaporation.

The invention has been described with reference to a particular embodiment but it will be appreciated that variations within the spirit and scope of the invention will occur to those skilled in the art. For example, a different technique of applying the information-representative charge to the semiconductor array could be utilized such as a two-phase charge-coupled technique. Also, information could be read into the array one line at a time by a multiplex switch which would read each line directly into its proper row. In such case, information could be transferred into display regions during the horizontal blanking intervals, if desired. Also, provision could be made for transferring charge into the display regions from two different electrodes of the charge-coupled device units; e.g. from the A electrodes after an "odd" field and from the C electrodes after an "even" field. In such case the clock phases would have to be controlled during alternate fields to cause the charge-representative information to come to rest under the appropriate electrodes. It can be further noted that a color display could be achieved by using multiple array in conjunction with different colored light beams. Each array could be controlled by a different color signal and a dichroic prism utilized in the manner of a color camera.

I claim:

1. Apparatus for receiving image-representative fields of electronic video information and displaying the images, comprising:
- a semiconductor substrate;
- an array of semiconductor devices formed in a surface of said substrate, each of said devices being capable of receiving an element of video information as represented by stored charge;
- means for sampling said video signal and for temporarily storing elemental samples thereof in said semiconductor devices;
- a layer of electrically deformable material disposed on said substrate; and
- optical means for converting deformations of said deformable material into an image.

2. An apparatus as defined by claim 1 further comprising a reflective layer disposed on said layer of deformable material.

3. An apparatus as defined by claim 2 wherein said reflective layer is formed of conductive material.

4. An apparatus as defined by claim 1 wherein said optical means comprises a schlieren optical system.

5. An apparatus as defined by claim 1 wherein said semiconductor devices are charge transfertype devices.

6. An apparatus as defined by claim 5 wherein said semiconductor devices are charge-coupled devices.

7. An apparatus as defined by claim 6 further comprising a reflective layer disposed on said layer of deformable material.

8. An apparatus as defined by claim 7 wherein said reflective layer is formed of conductive material.

9. An apparatus as defined by claim 6 wherein said optical means comprises a schlieren optical system.

10. An apparatus as defined by claim 6 wherein said layer of electrically deformable material is a gel.

11. Apparatus for receiving image-representative fields of electronic video information and displaying the images, comprising:
- a semiconductor substrate of one conductivity type;
- an array of charge-coupled devices formed in a surface of said substrate, each of said devices being capable of receiving an element of video information as represented by stored charge;
- a plurality of display regions formed in said surface and associated with said charge-coupled devices, each of said display regions comprising a region in said surface that is of opposite conductivity type than said semiconductor substrate;
- means for sampling said video signal and for temporarily storing elemental samples thereof in said charge-coupled devices in the form of stored charge;
- means for periodically transferring the charge stored in said charge-coupled devices to their associated display regions;
- a layer of electrically deformable material disposed on said substrate; and
- optical means for converting deformations of said deformable material into an image.

12. An apparatus as defined by claim 11 further comprising a reflective layer disposed on said layer of deformable material.

13. An apparatus as defined by claim 12 wherein said reflective layer is formed of conductive material.

14. An apparatus as defined by claim 11 wherein said optical means comprises a schlieren optical system.

15. An apparatus as defined by claim 11 wherein said layer of electrically deformable material is a gel.

16. An apparatus as defined by claim 12 wherein said layer of electrically deformable material is a gel.

17. An apparatus as defined by claim 11 wherein said means for transferring the stored charge in said charge-coupled devices to their associated display regions comprises a plurality of gate electrodes disposed on said semiconductor surface between said charge coupled devices and their associated display regions.

18. Apparatus as defined by claim 11 wherein two display regions are associated with each charge-coupled device in the array of charge-coupled devices.

19. An apparatus as defined by claim 18 wherein said means for transferring the stored charge in said charge-coupled devices to their associated display regions comprises a first plurality of gate electrodes disposed on said semiconductor surface between said charge-coupled devices and one of their associated display regions and a second plurality of gate electrodes disposed on said semiconductor surface between said charge-coupled devices and the other of their associated display regions.

20. An apparatus as defined in claim 11 wherein said means for sampling said video signal includes an input register comprising a chain of charge-coupled devices formed in said surface, said input register having proximity to said array of charge-coupled devices so that charge-representative information stored in said input register can be transferred to said array of charge-coupled devices, said input register having a sampling gate which is operative to sample said video signal.

* * * * *